May 6, 1958 J. F. SHIRK 2,833,605
PISTON RING ASSEMBLY
Filed March 3, 1955
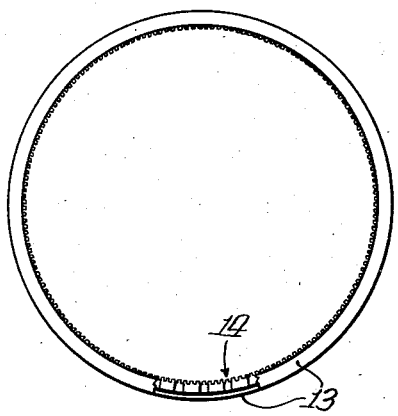
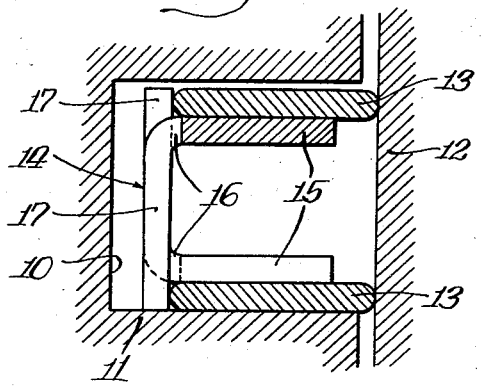
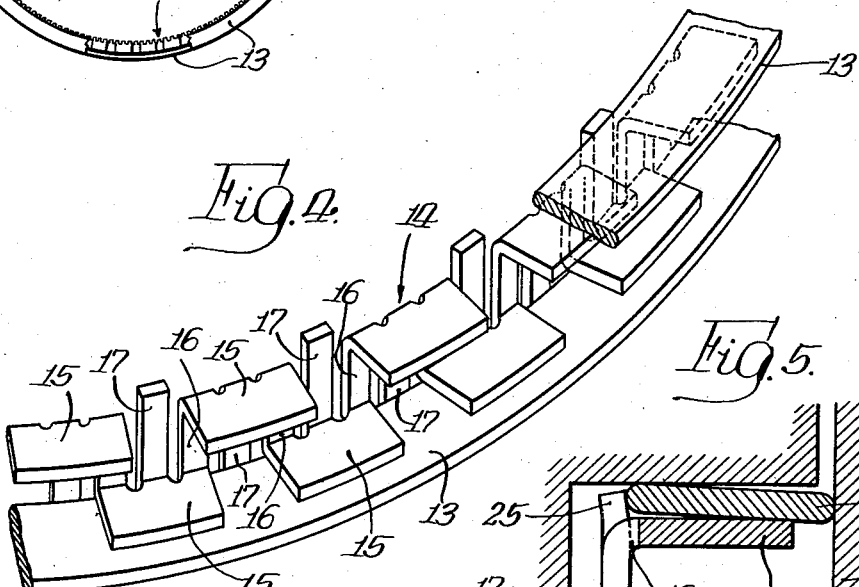
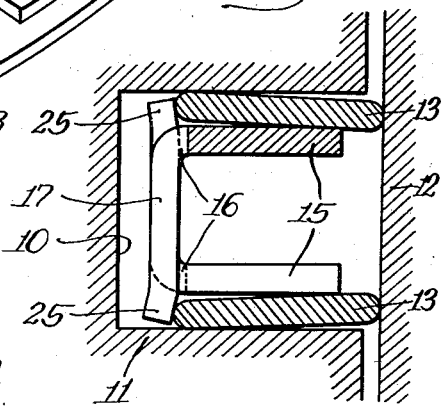
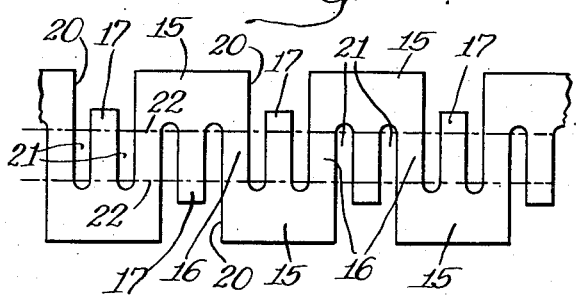
INVENTOR.
John F. Shirk,
BY
Davis, Lindsey, Hibben & Noyes
Attys.

United States Patent Office 2,833,605
Patented May 6, 1958

2,833,605

PISTON RING ASSEMBLY

John F. Shirk, Hagerstown, Ind., assignor to Perfect Circle Corporation, Hagerstown, Ind., a corporation of Indiana Application March 3, 1955, Serial No. 491,904

18 Claims. (Cl. 309—43)

The invention relates generally to piston rings and more particularly to a piston ring assembly including one or more rails.

The general object of the invention is to provide a piston ring assembly having a novel combined expanding and positioning means for one or more rails, which is of the circumferentially expansible type so that it does not have to contact the bottom of the groove in which the assembly is placed, which is made of sheet metal formed by inexpensive punching and bending operations, and which holds the rail or rails in engagement with the cylinder wall with the desired pressure.

Another object is to provide a piston ring assembly having a novel combined expanding and positioning means for one or more rails, said means being arranged to cause the rail or rails to bear outwardly against the cylinder wall and also to effect a side seal with the adjacent side of the groove.

Other objects and advantages will become apparent from the following description taken in connection with the accompanying drawing, in which—

Fig. 1 is a plan view of a piston ring assembly embodying the features of the invention;

Fig. 2 is an enlarged transverse sectional view of the ring assembly and showing it in position in a groove in a piston and in engagement with the cylinder wall;

Fig. 3 is a fragmentary view of a strip from which a part of the ring assembly is made;

Fig. 4 is a fragmentary perspective view of the ring assembly; and

Fig. 5 is a view similar to Fig. 2 but showing a modified form of ring assembly.

The ring assembly disclosed herein is of the type which comprises a combined expander and positioning means, and one or more cylinder-engaging rails. In the specific form disclosed in the drawing, there are two such rails and said positioning means holds the rails in axially spaced relation. The combined spacer and expander is of the circumferentially expansible type and comprises generally two annular rows of segments connected by a web structure providing for the circumferential expansion. The web structure connects the segments in one row with those in the other and also includes members adapted to engage the rail or rails to force them radially outward into engagement with the cylinder wall. These members are radially resilient in themselves so that the force resulting from the circumferential expansion of the combined spacer and expander is applied to the rail or rails resiliently through the members. In the form of the invention shown in Fig. 5, these members also exert some side pressure on the rails so that the inner peripheries thereof engage the adjacent sides of the groove to effect a seal therewith.

In Fig. 2, I have shown the piston ring assembly mounted in a groove 10 in a piston 11 and in engagement with the wall of a cylinder 12. In this instance, two rails 13 are provided and are held in axially spaced relation and are forced outwardly against the piston wall 12 by the combined spacer and expander, indicated generally at 14. Each rail is of the usual type comprising a flat steel annulus preferably having rounded inner and outer edges.

The combined spacer and expander means 14 is circumferentially expansible so that it can exert an outward force on the rails 13 without abutting against the bottom of the groove 10 in the piston. The combined spacer and expander thus may be said to be self-expansible. In the present instance, the combined spacer and expander comprises two rows of segments 15 which extend radially outward, and the two rows are axially spaced to hold the rails 13 in axially spaced relation to each other and adjacent the respective sides of the groove 10. The segments 15 in the present instance are circumferentially spaced from each other, and the segments in one row are in staggered relation with the segments in the other row.

The segments 15 are connected by a web structure which comprises axially extending web members 16 connecting the segments in one row with those in the other. The web members 16 extend from the inner edges of the segments 15 and in the present instance are located at the sides of the segments. Each segment has two such web members connecting it with two segments in the opposite row, and the web members 16 for each segment are circumferentially spaced from each other.

The web structure also includes means for engaging the rails 13 to force them outwardly, which means is resilient in character so that the force resulting from the circumferential expansion of the combined spacer and expander is resiliently applied to the rails. Thus, the web structure includes a plurality of axially extending members 17. Each member is integrally connected to the inner edge of a segment 15 and extends axially beyond the opposite row of segments to engage the rail 13 which is supported by such opposite row of segments. Each member 17 is positioned between the two web members 16 associated with the same segment and is located at the space between the connected segments in the opposite row. Since each member 17 extends beyond the opposite row of segments to engage a rail, it is the free end portion of the member 17 which contacts the rail and because the member is connected to a segment solely at one end, the member 17 has substantial radial resiliency and thus resiliently applies to the rail the force resulting from the tendency of the expander to expand.

As mentioned above, the combined spacer and expander 14 is made from an elongated strip of sheet metal. In Fig. 3, I have shown the manner in which such a strip is punched to provide for its finished form. Thus, in the strip, I punch notches 20 alternately in opposite sides of the strip, extending transversely thereof, with portions of the notches in opposite sides overlapping each other. Such overlapping of the notches on opposite sides results in the formation of the web member 16, the segments 15 comprising the portions lying along the respective edges of the strip. Each notch 20 at its inner portion is divided into two narrow finger-like slots 21, leaving a strip of metal between them constituting the member 17. The segments 15 are then bent along longitudinally extending lines 22 to extend outwardly from the central portion of the strip and since the lines 22 are inside of the free ends of the members 17, such ends will project beyond the segments so as to be in position to engage the rails. The formed strip is then given a circular shape to form a ring and the ends thereof are placed in abutment.

The circumferential dimension of the ring is such that when the rails are placed in the piston groove with the combined spacer and expander and the piston is placed in the cylinder, the ring is compressed so that by its circumferential expansion it will tend to increase its diameter and thus force the rails outwardly through the contact of the rails with the members 17. Each member 17, bearing at one end against the rail and connected at its other end to a segment, will have a radial resilience through which the force is applied to the rails.

In the modified embodiment of the invention shown in Fig. 5, I have shown a construction for a combined expander and spacer, which not only forces the rails outwardly and holds them in axially spaced relation but also causes the inner peripheral portions of the rails to bear against the adjacent sides of the groove 10 to effect a seal therewith. For this purpose, the free end portion of each member 17 is bent at a slight angle, as indicated at 25, so that the pressure thereof not only acts to force the rail outwardly but also tends to force the inner peripheral edge portion of the rail against the side of the groove. While, in Fig. 5, both rails are shown in a dished position, either or both of the rails at different points in the engine cycle may lie flat against the sides of the grooves while side pressure at the inner periphery is maintained, the rails in Fig. 5 being shown as they are merely to indicate that there is side pressure at the inner periphery. The major force exerted by this combined spacer and expander is exerted outwardly but there is sufficient side pressure exerted to effect the desired seal without producing excessive friction between the rails and the sides of the groove.

From the foregoing description, it will be apparent that I have provided a ring assembly comprising a novel combined expanding and positioning means for one or more rails. Since said means is of the circumferentially expansible type, it does not have to contact the bottom of the groove in which the assembly is placed. The combined spacer and expander is made of sheet metal and may be formed by inexpensive punching and bending operations, and it holds the rail or rails in engagement with the cylinder wall with the desired pressure. In the form shown in Fig. 5, the combined spacer and expander also functions to cause the inner peripheral portions of the rails to bear against the sides of the groove to effect a seal therewith.

I claim:

1. A piston ring assembly comprising a pair of axially spaced rails, and combined spacer and expander means for holding the rails in axially spaced relation and for forcing the rails outwardly, said spacer and expander means comprising two rows of segments holding the rails in axially spaced relation, and web structure at the inner periphery of said means having web members connecting the segments in the two rows and other web members bearing outwardly against the rails.

2. A piston ring assembly comprising a pair of axially spaced rails, and combined spacer and expander means for holding the rails in axially spaced relation and for forcing the rails outwardly, said spacer and expander means comprising two rows of segments holding the rails in axially spaced relation, and web structure at the inner periphery of said means having web members connecting the segments in the two rows and other web members extending axially beyond the segments to engage the rails and force them outwardly.

3. A piston ring assembly comprising a pair of axially spaced rails, and combined spacer and expander means for holding the rails in axially spaced relation and for forcing the rails outwardly, said spacer and expander means comprising two rows of segments holding the rails in axially spaced relation with the segments in each row circumferentially spaced from each other, and web structure connecting the segments in one row with those in the other row, said web structure including portions located at the spaces between the segments and extending axially to engage the rails and force them outwardly.

4. A piston ring assembly comprising a pair of axially spaced rails and combined spacer and expander means for holding the rails in axially spaced relation and for forcing the rails outwardly, said spacer and expander means comprising two rows of segments holding the rails in axially spaced relation, the segments in each row being circumferentially spaced from each other and being in staggered relation with the segments in the other row, and web structure connecting the segments in one row with those in the other row, said web structure including two sets of rail engaging portions extending axially at the spaces between the segments to engage the rails with the portions engaging one rail being in staggered relation to the portions engaging the other rail.

5. A piston ring assembly comprising a pair of axially spaced rails, and combined spacer and expander means for holding the rails in axially spaced relation and for forcing the rails outwardly, said spacer and expander means comprising two rows of segments holding the rails in axially spaced relation, each segment having a pair of web members connected to segments in the opposite row, and each segment having a rail engaging member located between and positioned generally parallel to said pair of web members for forcing the rails outwardly.

6. A piston ring assembly comprising a pair of axially spaced rails, and combined spacer and expander means for holding the rails in axially spaced relation and for forcing the rails outwardly, said spacer and expander means comprising two rows of segments holding the rails in axially spaced relation, each segment having a pair of circumferentially spaced web members extending axially to segments in the opposite row and each segment having a rail engaging member extending axially between said web members to engage the rail supported by said opposite row of segments.

7. A piston ring assembly comprising a pair of axially spaced rails, and combined spacer and expander means for holding the rails in axially spaced relation and for forcing the rails outwardly, said spacer and expander means comprising two rows of rail engaging segments connected by web members, each segment in each row having a rail engaging member extending axially beyond the opposite row of segments to engage the rail adjacent said opposite row.

8. A piston ring assembly comprising a pair of axially spaced rails, and expander means for holding the rails in axially spaced relation, said means comprising circumferentially expansible structure and having radially resilient members extending from said structure and engaging the inner peripheries of the rails to force them outwardly.

9. A piston ring assembly comprising a pair of axially spaced rails, and a circumferentially expansible structure for holding the rails in axially spaced relation, said structure having means for engaging the rails, which is radially resilient whereby the force resulting from the circumferential expansion is resiliently applied to said rails.

10. A piston ring assembly comprising a pair of axially spaced rails, and combined spacer and expander means for holding the rails in axially spaced relation and for forcing the rails outwardly, said spacer and expander means comprising two rows of segments engaging the respective rails, web structure connecting the two rows, and a radially resilient member extending from each segment and separated from the web structure and bearing against the rail engaged by the opposite row of segments.

11. A piston ring assembly comprising a cylinder engaging rail, and combined expanding and positioning means for holding the rail at one side of the groove, said means being self-expanding and having a plurality of radially resilient members engaging the rail to force it outwardly.

12. A piston ring assembly comprising a cylinder engaging rail, and combined expanding and positioning means for holding the rail at one side of the groove, said means comprising a circumferentially expansible structure having a plurality of radially resilient members bearing outwardly on the rail.

13. A piston ring assembly comprising a pair of axially spaced rails, and expander means for holding the rails in axially spaced relation, said means being circumferentially expansible and having axially extending radially resilient members connected at one end to said means, the other ends of the members bearing against the rails to force them outwardly.

14. A piston ring assembly comprising a pair of axially spaced rails, and expander means for holding the rails in axially spaced relation, said means being circumferentially expansible and having axially extending radially resilient members connected at one end to said means, said members at their other ends having portions bent at an angle and bearing against the rails to force the rails outwardly and to force inner peripheries of the rails toward the adjacent sides of the groove.

15. A combined spacer and expander means for use with a pair of rails to form a piston ring assembly, said means comprising a circumferentially expansible structure including radially resilient members adapted to engage the rails to force them outwardly.

16. A combined spacer and expander means for use with a pair of rails to form a piston ring assembly, said means comprising two rows of segments, web members connecting the segments in one row with those in the other row, and radially resilient members extending axially from the segment and adapted to engage the rails to force them outwardly.

17. A combined spacer and expander means for use with a pair of rails to form a piston ring assembly, said means comprising two rows of segments, and web structure having portions separated from the first-mentioned portions and connecting the segments, and other portions adapted to engage the rails to force them outwardly.

18. A combined spacer and expander means for use with a pair of rails to form a piston ring assembly, said means comprising two rows of segments, each segment having a pair of web members connected to segments in the opposite row, and each segment having a rail engaging member located between and positioned generally parallel to said pair of web members for forcing the rails outwardly.

References Cited in the file of this patent

UNITED STATES PATENTS

| | | |
|---|---|---|
| 2,111,258 | Zahodiakin | Mar. 15, 1938 |
| 2,220,948 | Paton | Nov. 12, 1940 |
| 2,635,022 | Shirk | Apr. 14, 1953 |
| 2,670,256 | Hsia-Si Pien | Feb. 23, 1954 |
| 2,695,825 | Estey | Nov. 30, 1954 |